(12) United States Patent
Domingo et al.

(10) Patent No.: US 8,242,940 B2
(45) Date of Patent: Aug. 14, 2012

(54) TRANSITIONING DIGITAL DATA PROCESSORS BETWEEN POWER SAVINGS AND NON-POWER SAVINGS MODES

(75) Inventors: Pablo Ventura Domingo, Valencia (ES); Lucas Valentin Garcia, Picassent (ES); Michael Joseph Fernald, Kernersville, NC (US); Rajesh Rama Chandran, Kerala State (IN); Joseph Michael Barry, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 63 days.

(21) Appl. No.: 12/966,045

(22) Filed: Dec. 13, 2010

(65) Prior Publication Data

US 2011/0148672 A1    Jun. 23, 2011

Related U.S. Application Data

(60) Provisional application No. 61/287,566, filed on Dec. 17, 2009.

(51) Int. Cl.
*H03M 9/00* (2006.01)
(52) U.S. Cl. .......... 341/100; 710/65; 713/320; 713/601; 726/26
(58) Field of Classification Search ........... 341/100–101
See application file for complete search history.

(56) References Cited

U.S. PATENT DOCUMENTS

| 7,463,171 | B2 * | 12/2008 | Baba ............................. 341/100 |
| 7,561,074 | B2 | 7/2009 | Pasqualino |
| 2006/0280055 | A1 | 12/2006 | Miller et al. |
| 2007/0150214 | A1 | 6/2007 | Qin et al. |
| 2007/0226769 | A1 | 9/2007 | Waki |
| 2009/0109988 | A1 | 4/2009 | Musunuri et al. |

FOREIGN PATENT DOCUMENTS

WO    20090040523    4/2009

OTHER PUBLICATIONS

International Search Report and Written Opinion for PCT/US2010/0059994 mailed on Feb. 15, 2011.

* cited by examiner

*Primary Examiner* — Lam T Mai
(74) *Attorney, Agent, or Firm* — Kenyon & Kenyon LLP

(57) ABSTRACT

A sink may be to used to process multimedia digital data. The sink may include a plurality of input ports, an output port, a switchably-enabled selector to select an input port from a plurality of HDMI input ports to couple to an output port, a control circuit to detect encrypted data in a channel of the input ports; and a plurality of decryption engines. Each of the decryption engines may be coupled to respective input ports to synchronize with a corresponding encryption engine of a data source after the control circuit detects encrypted data in the channel of the respective input port. Additional circuitry may be included to operate the sink in a power saving mode. Also, methods for processing the data in both power saving and non-power saving modes.

19 Claims, 5 Drawing Sheets

TRANSITIONING DIGITAL DATA PROCESSORS BETWEEN POWER SAVINGS AND NON-POWER SAVINGS MODES

CROSS-REFERENCE TO RELATED APPLICATION

This application claims the benefit of U.S. Provisional Patent Application No. 61/287,566, filed Dec. 17, 2009, which is incorporated herein by reference in its entirety.

BACKGROUND INFORMATION

High definition multimedia interfaces (HDMI) have been used to digitally transmit audio and video between different multimedia sources, such as DVD players, gaming consoles, and cable television set top boxes, to different display devices, such as televisions or video projectors. HDMI audio and video signals may be transmitted over three separate serial digital data streams on three channels. Each of these three data streams may include active video data frames, such as pixel data and the like.

Audio and video signal transmitted over HDMI may be received at a HDMI sink. An HDMI sink may include multiple input ports for receiving HDMI audio and video data from multiple sources. An HDMI television, for example, may have a HDMI sink with three or more HDMI input ports for receiving signals from different input sources, such as DVD players, cable television set top boxes, and video game consoles. A user can then select the HDMI input source that they want to watch on the television.

To prevent unauthorized copying of audio and video programs, some of the data on these channels may be encrypted. The data that may be encrypted could include some or all of the video and/or audio data on at least one of the three channels. The HDMI sink can decrypt encrypted data using a decryption engine and then convert it to a format compatible with the television set, for example, so the video can be seen and the audio can be heard.

Existing HDMI sinks tend to consume a relatively large amount of power. In order to conserve power, some existing HDMI sinks power down the input ports of non-selected input ports, leaving only one input port powered up. The input port left powered up may be the selected input port of a source currently being viewed on the television, for example. One of the problems with powering down non-selected input ports is that when a user wants to switch inputs, say from a DVD player to a cable set top box, the user may have to wait up to ten seconds or more for the decryption engine of the powered up port to authenticate and synchronize with the encryption engine of the newly selected input source.

Instead of powering down all channels in non-selected input ports, an attempt may be made to only power down a subset of data channels in each input port. However, when these powered down channels are subsequently powered up, invalid data may be produced due to timing mismatches between channels leading to a loss of authentication. The timing mismatches may occur because the circuits in HDMI sinks may include a number of serially disposed data processing elements to perform specific functions on the digital data in order to generate the actual video and audio outputted to the user. For example, one data processing element may perform a filtering function, while another performs a decoding function and a third performs an interleaving process. However, the time required by each of these elements to perform their respective functions may vary. For example, one of the data processing elements may require only one or two clock cycles to perform its function, while another may take five or more clock cycles to carry out its function on the data.

Since the digital data elements are arranged in series, the initial data produced by some of the data processing elements after being initially powered up may be invalid data. This invalid data may result from residual data left in the processing element from a previous power up cycle and may cause additional delays in producing data suitable for display on a video device. The invalid data may cause undesirable distorted images to be initially displayed on the digital video display device.

There is a need to minimize power consumption in HDMI sinks while enabling fast switching between input sources containing encrypted data. There is also a need to eliminate invalid data produced by some serial data processing elements when initially powering up the elements.

BRIEF DESCRIPTION OF THE DRAWINGS

The following description of an embodiment of the invention is given by way of example only with reference to the accompanying drawings.

DETAILED DESCRIPTION

Figure 1:
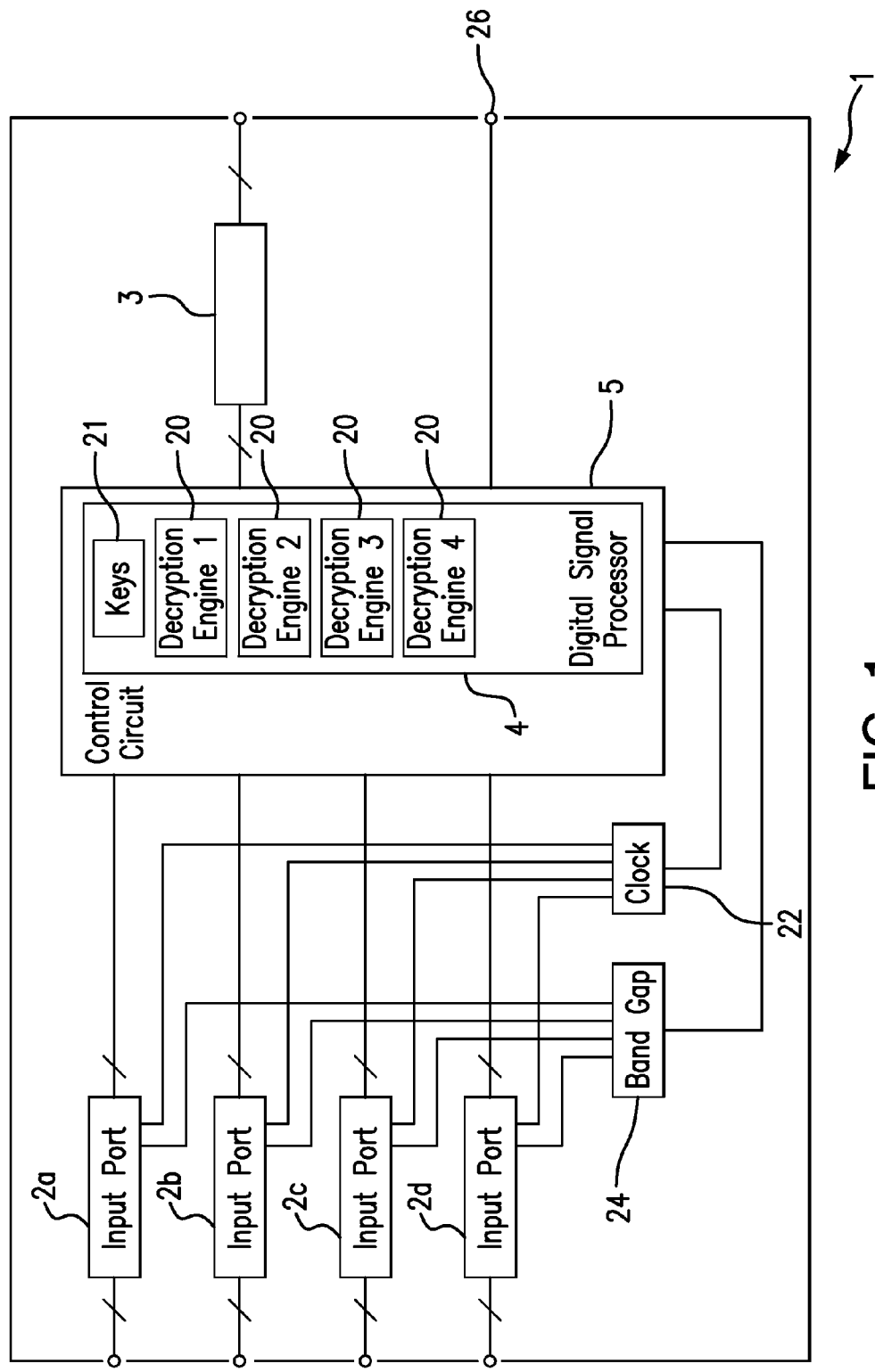
FIG. 1 is a block schematic representation of a HDMI sink in an embodiment of the invention.

An embodiment of the invention may include a sink with multiple input ports for receiving digital audio/video data from different sources. The sink may also include an output port. Audio/video data from a selected input port source may be processed and outputted to a digital signal processing device, such as a television, digital video recorder, or other device. The sink, sources, and data may be HDMI compliant. Each of the input ports may include multiple channels for receiving respective serial digital data streams and a display data channel. The non-selected input ports coupled to sources transmitting encrypted data may keep the processing elements and components of at least one data channel powered up to maintain continuous authentication with respective sources, even when switching between the power savings and non-power savings modes. A control circuit may send a signal to a channel of non-selected input ports to power down data processing elements and components of that channel when operating in a power savings mode. The powered down elements and components may then be powered up when switching to a non-power savings mode.

The remaining channels of each input port may stay powered up in both a power saving mode and a non-power saving mode. In a three channel port, for example, the first channel may carry vertical sync signals and third channel may carry encryption enable signals. Both of these channels may stay powered up in both the power saving and non-power saving modes, while the elements and components in the second channel may then be powered down and powered up when switching between the power saving and non-power saving modes. A control circuit may send power up and power down signals to the input ports to power up and power down at least some of the elements and components in the second channel of ports exiting or entering the power saving mode.

The control circuit may monitor the first and third channels in each non-selected input port to detect encrypted data frames and maintain authentication and synchronization with the encryption engines of respective non-selected sources. The control circuit may detect encrypted data by detecting vertical sync signals in the first channel and at least a part of the corresponding encryption enable code in the third channel indicating when a subsequent data frame is encrypted.

The sink may include a decryption engine associated with each input port, a key storing means, such as a memory, to store decryption keys to decrypt data in the serial data streams, a digital signal processing circuit to produce decryption codes for respective decryption engines, and a control circuit to control access to decryption keys to make them sequentially accessible for authentication functions.

Other embodiments may have different sink configurations. Some HDMI circuit configurations may include multiple sinks, each with its own sink input port, decryption engine, and output port. Each of the sinks may be implemented as integrated circuits that are part of the HDMI circuit, which may be implemented as a single integrated circuit including at least one HDMI interface. Audio/video data from a HDMI source connected to a sink input may be processed and outputted at the output port of the sink. The output ports of each sink may be connected to a primary output port of the circuit through a digital data path.

The digital data path may include a multiplexer. The multiplexer may selectively connect the output port of different sinks in the circuit to the primary output port of the circuit. This selective connection may occur in response to a source select signal indicating which sink output port should be selectively connected to the primary output port.

In an embodiment, each of the output ports may be connected to the primary output port. Each of the output ports may be operated in a normally disabled mode where audio and video signals are prevented from being outputted through a sink output port. Each output port may be switched to an enable mode where audio and video signals processed by the sink are outputted through the sink output port to the primary output port of the circuit. A source select signal may enable a selected sink output port and disable an unselected output port.

The control circuit may control access to decryption keys using a queue to process authentication requests in the order they were received from each input port. The authentication requests may be transmitted from input sources requesting authentication over the display data channel and the control circuit may monitor the display data channels of the input ports for the authentication requests, which may be added to the queue after detection. Accordingly, the control circuit may sample signals on the display data channel of the input ports at a higher frequency than that of data on the display data channel. In some embodiments, the control circuit may sample signals on the display data channels at a frequency that is at least 10 times greater than the frequency of data on the channels. For example, in an embodiment where each symbol is represented by 10 bits and each bit is oversampled by a factor of 3, the control circuit may sample signals on the display data channels at a frequency that is 30 times greater than the frequency of the data on the channels.

Once the control circuit detects an authentication request at an input port, the digital signal processing circuit of that input port may permit writing of a key selection vection (AKSV) at the display data channel of the input port to a temporary storing means, such as a memory. The digital signal processing circuit may also read decryption keys stored in the key storing means after receiving access from the control circuit and compute a decryption code based on the decryption keys and the key selection vector AKSV. The decryption code may be updated in response to receiving a vertical sync signal on the first channel and at least a part of an encryption enable signal on the third channel of the input port. The decryption code may still be updated when operating in the power saving mode.

In an embodiment, the digital signal processing circuit may also produce its own key selection vector (BKSV) that is transmitted over the display data channel of one or more input ports. A source connected to an input port may then read the key selection vector BKSV and calculate its own code to facilitate authentication of the decryption engine on the respective port.

The data processing elements in each channel may include a serial to parallel data converter, a delay circuit, and a decoding circuit to decode transmission line encodings into natural binary, which may all be capable of processing parallel data. In some embodiments, the data processing elements may also include a high bandwidth digital content protection (HDCP) circuit, which may be adapted to process parallel data. The serial to parallel converter may convert serial digital data in a channel to parallel data and the delay circuit may delay the parallel data in each channel of an input port until the parallel data in all three channels of the input port are aligned. When an input port in a power savings mode is switched to a non-power savings mode and powered up, each of the data processing elements in the second channel may be progressively enabled. The progressive enabling may be triggered by a data enable signal generated at a preceding data element when the preceding data element processes valid data.

The components in each channel may include at least one of an automatic gain control circuit, a sampling circuit, and an equalizer circuit. When powering down components in the second channel of an input port in a power savings mode, the sampling circuit in the second channel may be powered down first, followed by the equalizer circuit, and then the automatic gain control circuit. The reverse sequence may be used to power up these elements when switching to a non-power savings mode. Delays between powering components in the range of about 0.5 to 5 ms, about 1 to 3 ms, and about 1 ms may be used in different embodiments, though other delays outside these ranges are also possible in other embodiments.

The control circuit may also be configured to periodically power up elements and/or components in the second channel of ports in the power saving mode in order to retrieve data from a video signal supplied to the port. This data may include a horizontal or vertical parameter of the video, a type of incoming audio samples, a color depth in bits of video data, a pixel repetition rate, or other information.

Figure 2:
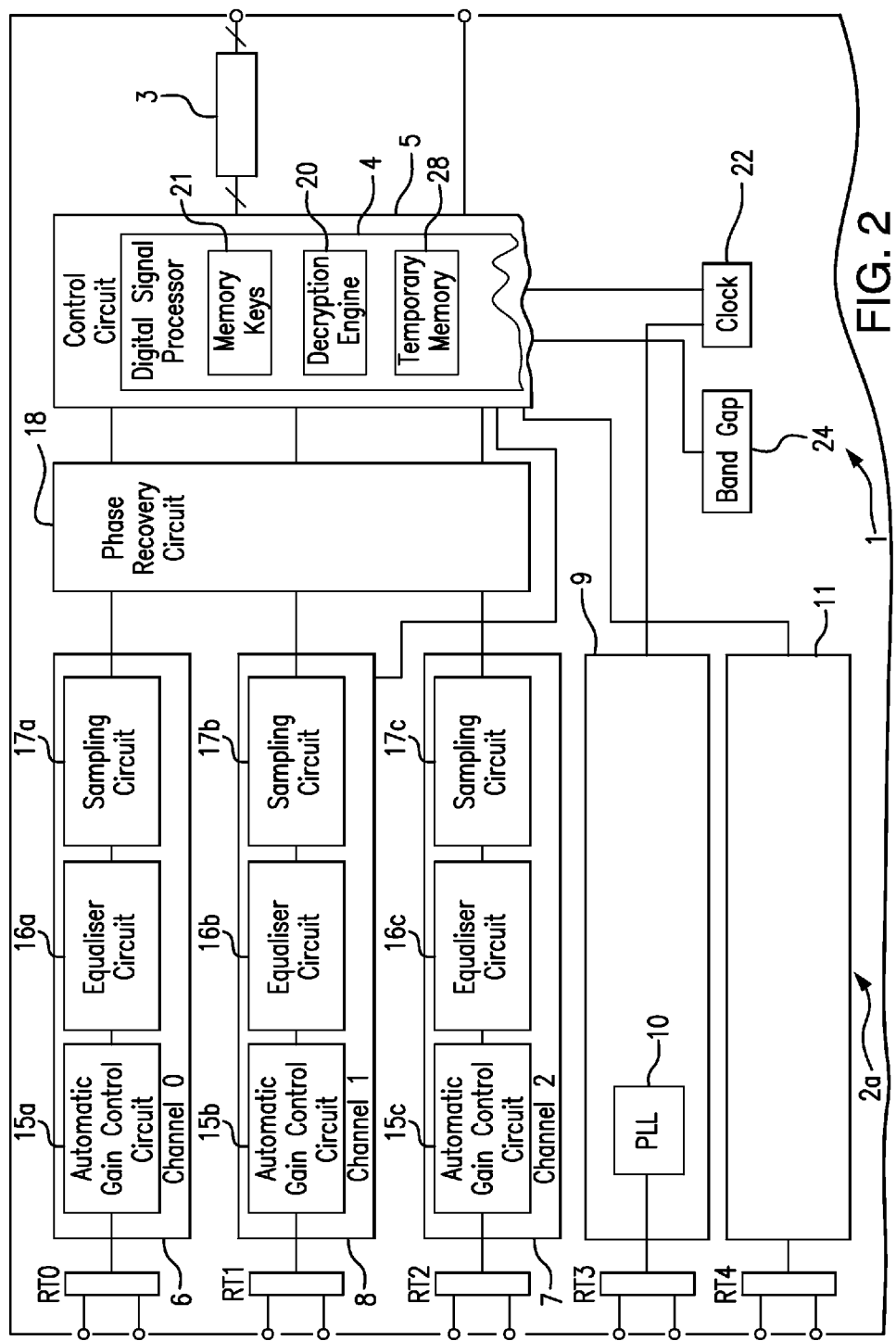
FIG. 2 is a block representation of a digital signal processor and an input port of the HDMI sink of FIG. 1.

FIGS. 1 and 2 show a configuration of a HDMI sink 1 in an embodiment of the invention for receiving serial digital video and/or audio data streams from respective HDMI sources (not shown). An HDMI sink 1 may include four input ports 2a, 2b, 2c and 2d that may receive HDMI data streams from the respective HDMI sources. In some embodiments, the data in at least one of the HDMI data streams may be encrypted. Each of the input ports 2b, 2c, and 2d may be similar to the input port 2a, which is illustrated in detail in FIG. 2. The data streams from the respective HDMI sources (not shown) may originate from any audio and video HDMI source, such as a DVD player, a gaming station, a set top box from a cable provider, or any other HDMI source.

Figure 3:
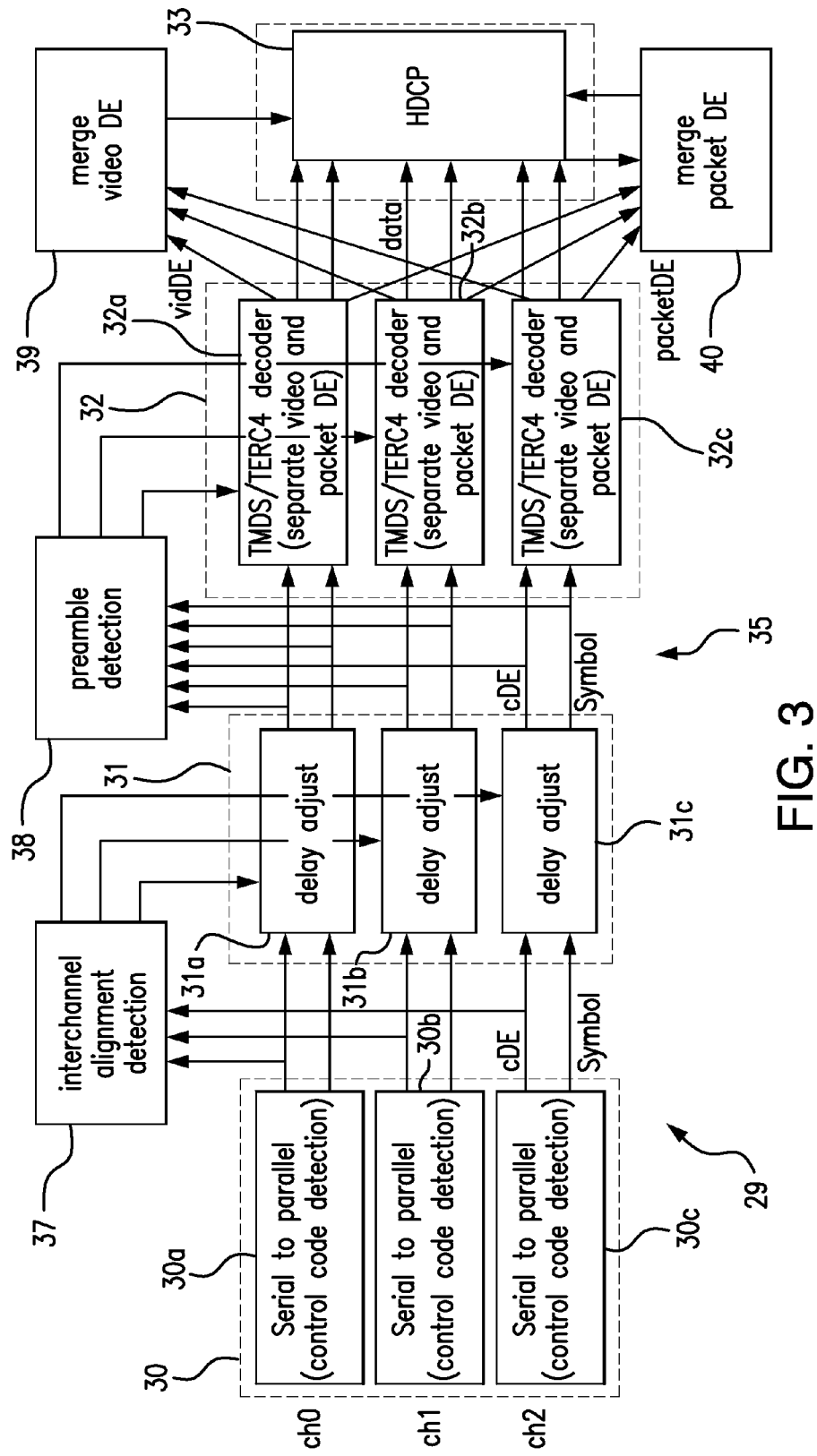
FIG. 3 is a block representation of a existing digital data processing system for use in a sink.
Figure 4:
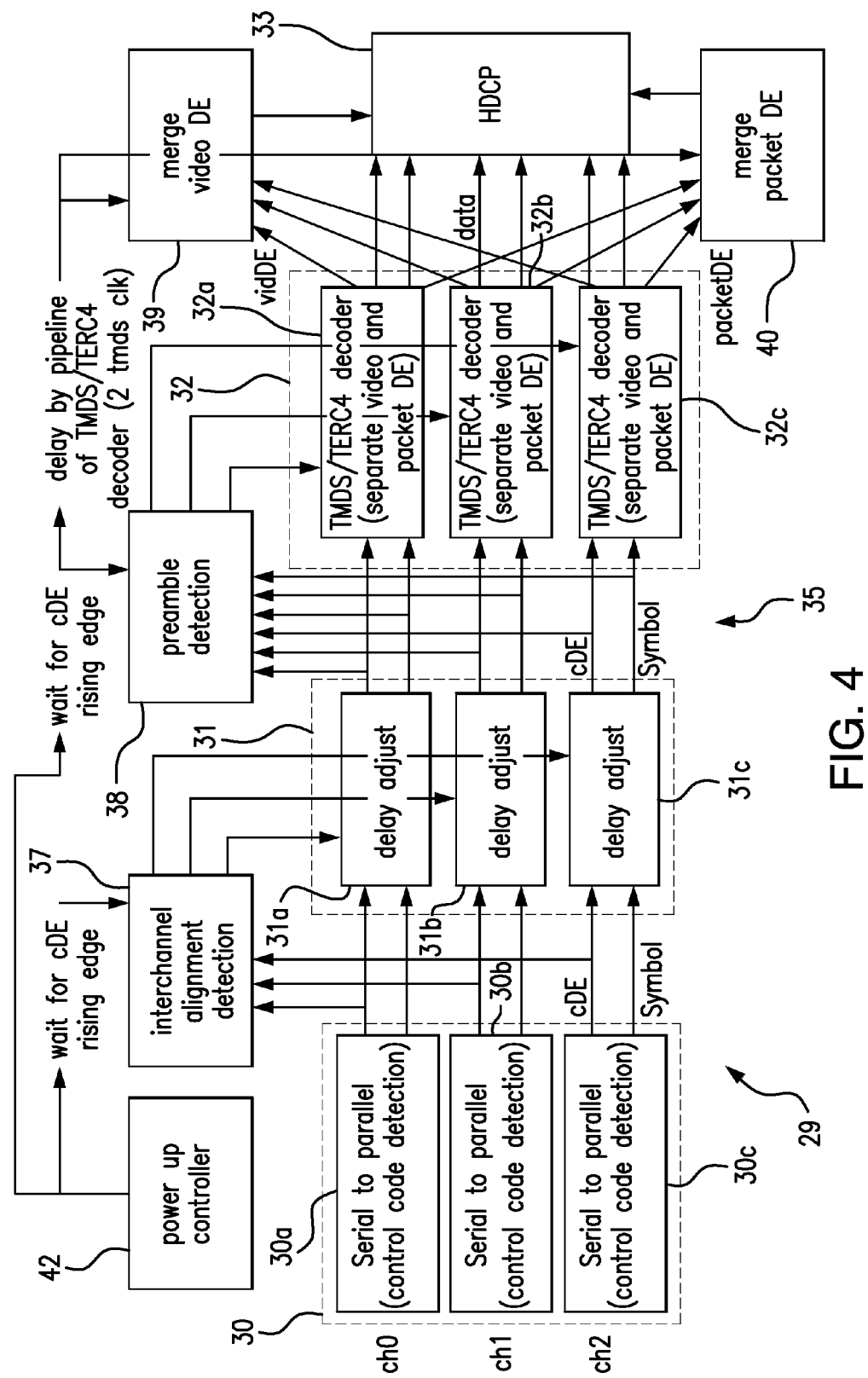
FIG. 4 is a block representation of a digital data processing system in an embodiment of the invention.

The HDMI sink 1 may process and convert the serial digital data streams received at the respective input ports 2 through the digital signal processor 4 in order to generate digital video and/or audio signals compatible with a digital video display device, such as a digital television set or other digital video signal processing device, which may be outputted at an output port 3 of the HDMI sink 1. The digital signal processor 4 may be located within a control circuit 5. The control circuit 5 may control operation of the HDMI sink and the digital signal processor 4. FIGS. 3 and 4 show some configurations of digital signal processor 4.

Each input port 2 may include three channels, namely, a first channel 6, generally referred to as "channel zero," a second channel 7, generally referred to as "channel one," and a third channel 8, generally referred to as "channel two." Each of these three channels 6, 7, and 8 may receive respective serial digital data streams. The serial digital data streams may include active video content, audio and other packet data, and/or control and status signals. The nature of the active video content on each of the three channels 6, 7, and 8 depends on the format of data being transmitted from the HDMI source (not shown) to the HDMI sink 1. If, for example, the video data is being transmitted in the RGB format, channel 6 may carry pixel color data relating to the color blue, channel 7 may carry pixel color data relating to the color green, and channel 8 may carry pixel color data relating to the color red.

However, regardless of the data format selected, channel 6 may transmit vertical and horizontal sync codes and channels 7 and 8 may transmit respective bits of an encryption enable code which may be indicative of the encryption status of the next following frame of active video data. In some embodiments, the bit of the encryption enable code transmitted on channel 8 may be in either a high or low state when the next frame of data is encrypted, and may be in the opposite state when the next frame of data is not encrypted. Accordingly, by monitoring channel 6 for the code representative of the vertical sync signals, and channel 8 for the relevant bit of the encryption enable code, the encryption status of each frame of data carried on the three channels 6, 7 and 8 can be readily determined. This principle may be used in an embodiment to minimize power consumption.

The serial data streams on channels 0, 1 and/or 2 may also be monitored to detect a display enable signal transition from an inactive to an active state, and also from an active to an inactive state. Transitions from inactive to active states may be used to identify the start of active video data in the three data streams and transitions from active to inactive states may be used to identify the start of blanking regions. Data representing these signal transitions may be extracted from one or more of the channels. A blanking region may include vertical and horizontal sync signals, control and other data, digital packet audio data, and encryption enable code signals.

Each input port 2 may also include other channels. For example, an input port may include a clock channel 9 that receives a clock signal from the corresponding HDMI source. The clock channel 9 may include a phase lock loop 10 for recovering and cleaning the clock signal received from the corresponding HDMI source. A display data channel (DDC) 11 may transfer hand shaking data between the HDMI source and the HDMI sink using a protocol such as I²C, though other embodiments may use different protocols. The display data channel may also be used to transfer encryption and/or decryption data. Other channels (not shown) may also be used to transmit signals of different applications and/or verify connectivity between a HDMI source and a corresponding input port 2 of the HDMI sink 1.

Differential signaling may be used to transmit data in the serial digital data streams of each channel 0, 1, and 2. Terminating resistors RT0, RT1, and RT2 may be used to terminate the differential inputs of each respective channel 0, 1, and 2, of an input port 2. A differential clock signal may be transmitted over the clock channel 9, and differential protocol and handshaking signals may be transmitted over the DDC channel 11. Terminating resistors RT3 and RT4 may also be used to terminate the differential inputs of the clock channel 9 and DDC channel 11, respectively.

An automatic gain control circuit 15 may be included in each channel 0, 1, and 2, to adjust the gain of the data stream in the corresponding channel. For convenience, the automatic gain control circuit 15 of channel 0 may be identified by the reference numeral 15*a*, the automatic gain control circuit 15 of channel 1 may be identified by the reference number 15*b*, while the automatic gain control circuit 15 of channel 2 may be identified by the reference numeral 15*c*. Each channel 0, 1 and 2 also may include an equalizer circuit 16 to equalize the channel gain with frequency of the data signals in the data stream. The equalizer circuit 16 of channel 0 is identified by the reference numeral 16*a*, while the equalizer circuits 16 of channels 1 and 2 are identified by the reference numerals 16*b* and 16*c*, respectively.

Each channel 0, 1 and 2 may also include a sampling circuit 17 to sample data from the data stream of that channel. The sampled data may be sent to the digital signal processor 4. The sampling circuit 17 of channel 0 may be identified by the reference numeral 17*a*, while the sampling circuit 17 of channels 1 and 2 may be identified by the reference numerals 17*b* and 17*c*, respectively.

Each input port 2 may have a phase recovery circuit 18 to recover the optimal phases of oversampled data in each of the sampling circuits 17*a*, *b*, and *c*.

Each input port 2 may also have a decryption engine 20 to decrypt the encrypted data in the serial data streams of each channel 0, 1, and 2. In the embodiment shown in FIG. 1, there are four input ports 2*a*, 2*b*, 2*c*, and 2*d*, and four decryption engines 20 in the digital signal processor 4, though in other embodiments different numbers of input ports and decryption engines may be used. The digital signal processor 4 may store decryption keys used to update decryption codes of the respective decryption engines 20. The decryption keys may be stored in a suitable memory 21. In an embodiment, forty 56-bit keys may be stored in a memory 21 of the digital signal processor 4, though other quantities of keys with varying bit lengths may be used in other embodiments.

Clock circuit 22 may obtain a clock signal from an input port 2. This clock signal may be synchronized with the clock signal applied to the clock channel 9 of the input port. Phase lock loop circuit 10 may be used to maintain clock signal synchronization by recovering and cleaning clock signal irregularities. The clock circuit 22 may supply a clock signal to digital signal processor 4. Band gap circuit 24 may supply a bias current to the equalizers 16 of each input port channel 0, 1, and 2.

A select signal may be sent to the control circuit 5 to select an input port 2 that will have its audio and video data redirected to the output port 3. A remote control unit of an audio/video device may send the select signal to a select signal port 26 to enable the selected audio/video data to be sent through the output port 3. The select signal may also be generated from any other suitable source.

The control circuit 5 may also control a digital signal processor 4. The digital signal processor 4 may extract video and audio data, vertical and horizontal syncs, and other control and/or status data from the serial data streams on channels

0, 1 and 2. The digital signal processor 4 may then reformat the extracted data in an output format compatible with a digital video device. The reformatted data may be sent to the digital video device through the output port 3.

As mentioned above, horizontal and vertical sync signal codes may be provided on channel 0 and the relevant bit of the encryption enable code indicating the encryption status of the next active video data frame may be provided on channel 2. Thus, only channels 0 and 2 may be monitored to maintain synchronization and authentication between the decryption engine 20 of each input port 2 and the encryption engine of the corresponding HDMI source. Since channel 1 is not needed to maintain synchronization and authentication, the control circuit 5 may power down channel 1 of each input port that is to be operated in a power saving mode. Channels 0 and 2 of the input ports operating in the power saving mode may stay powered up to maintain encryption authentication and synchronization. During the powering down of channel 1, the automatic gain control channel 15*b*, the equalizer circuit 16*b* and the sampling circuit 17*b* of channel 1 may each be powered down as well.

The control circuit 5 may monitor channels 0 and 2 of each input port 2 operating in the power saving mode for vertical sync signal codes on channel 0, and for the relevant bit of the encryption enable codes on channel 2 to identify encrypted frames of active video data. Each time the control circuit 5 identifies an encrypted frame in an input port, which may be operating in the power saving mode, the digital signal processor 4 may update the decryption engine 20 of that input port 2 to maintain authentication and synchronization between the decryption engine 20 of that input port 2 and the encryption engine of the corresponding HDMI source (not shown).

Continuous updating of input port decryption engines 20, which may be operating in the power saving mode, ensure that the decryption engines 20 may be continuously authenticated and synchronized with the encryption engines of the respective corresponding HDMI sources. Thus, when an encrypted video signal in an input port 2 operating in the power saving mode is selected for output, virtually no delay occurs in processing the serial digital data streams from the newly selected input port 2 and then outputting the corresponding audio video data signal on the output port 3. This is because the decryption engine 20 of the newly selected input port 2 has been continuously authenticated and synchronized with the encryption engine of the corresponding HDMI source, regardless of whether the input port 2 is operating in a power saving mode or not.

To enter the power saving mode, the control circuit 5 may send a deactivate signal to each input port 2 other than a selected input port 2 having a signal connected to the output port 3 for output. The deactivate signal may power down channel 1 of each non-selected input port 2 to operate these ports in the power saving mode. An activate signal may be sent by the control circuit 5 to an input port 2 to power up channel 1 of that input port 2.

To start the authentication process, each display data channel may carry a write signal from a source connected to an input port 2. The write signal may represent an authentication to start the process of authenticating the decryption engine 20 coupled to the input port 2 connected to the source. The control circuit 5 may monitor the display data channels of the input ports for such authentication requests.

During an authentication request, an HDMI source submitting the request may submit a key selection vector AKSV over its display data channel 11 along with other data that is stored in memory 28. Once the control circuit 5 allows the digital signal processor 4 to access the encryption keys in key memory 21, the digital signal processor 4 may read the AKSV and other data from memory 28, and then may produce a decryption code for the engine 20 from the decryption keys retrieved from key memory 21 based on the AKSV. The digital signal processor 4 may also make its own key selection vector BKSV available to the source to ensure authentication of the decryption engine 20.

To decrypt data, the serial digital data streams on each channel 0, 1, and 2 of a selected input port 2 may be clocked into the digital signal processor 4 based on a clock signal generated by clock signal generating circuit 22. The clocked data may then be de-serialized and decrypted by the corresponding decryption engine 20 using the decryption code. The decrypted data, including the digital audio/video signal, horizontal and/or vertical sync signals, and any other control or status data may then be sent to the output port 3 by the digital signal processor 4 to another digital signal processing device, such as a television, digital video projection, or other device.

To avoid the situation in which multiple authentication requests are received simultaneously or sufficiently close in time that authentication of at least two engines 20 in two input ports 2 would overlap, the control circuit 5 may use a queue to limit access to the encryption keys.

The control circuit 5 may be programmed to limit access to the decryption keys in key memory 21 to the digital signal processor 4 so that only one decryption engine 20 may be authenticated at a time. To do this, the control circuit 5 may queue authentication requests so that they are processed in the order they may be received.

To detect authentication requests, the control circuit 5 may sample the display data channels 11 of input ports 2 for key exchange information at a higher sampling frequency than the frequency at which data is provided. For example, a 100 kHz I2C protocol on the display data channel may be sampled at a higher frequency, such as 50 MHz to arbitrate multiple authentication requests within a single 100 kHz cycle.

Referring now to FIGS. 3 and 4, a data processing system 29 may process digital data received from each channel 0, 1, and 2 through a first digital data processing element 30, a second digital data processing element 31, a third digital data processing element 32, and a fourth digital data processing element 33. These data processing elements 30 to 33 may be serially disposed in a digital data path 35. The data processing system 29 may also be implemented in the digital signal processor 4.

Each of the first three data processing elements 30, 31, and 32 may include sub-digital data processing elements 30*a*-30*c*, 31*a*-31*c*, and 32*a*-32*c*. Sub-processing elements 30*a*, 31*a*, and 32*a*, may process digital data on channel 0, while sub-processing elements 30*b*, 31*b*, and 32*b* may process digital data on channel 1, and sub-processing elements 30*c*, 31*c*, and 32*c* on channel 2.

Elements 30*a*, 30*b*, and 30*c* may receive serial data from respective channels 0, 1 and 2 and convert the serial data to parallel data. Elements 30*a*, 30*b* and 30*c* may also extract control codes from the serial digital data on each respective channel. The converted parallel data may then be clocked from elements 30*a*, 30*b* and 30*c*, to elements 31*a*, 31*b* and 31*c*, respectively, of the second data processing element 31. This clocking, however, may be delayed until all of the parallel digital data being produced by the first elements 30*a*, 30*b*, and 30*c* is valid as will be described below.

Elements 31*a*, 31*b* and 31*c* may each include a delay to delay the data at each element until valid data received from elements 30*a*, 30*b* and 30*c* have been aligned. The aligned data may then be clocked from elements 31a, 31b and 31c to respective elements 32a, 32b, and 32c of the third data processing element 32. However, as described below, this clocking may not occur until the data from elements 31a, 31b, and 31c is valid and aligned.

Elements 32a, 32b, and 32c may decode TMDS (transitional minimized differential signalling) and/or TERC4 (TMDS error reduction coding) encoded signals into natural binary. The digital data may then be clocked from elements 32a, 32b and 32c to a fourth data processing element 33 to execute high bandwidth digital content protection (HDCP) on the data. However, this clocking may occur only when the data at respective elements 32a, 32b, and 32c is valid, as described below.

To ensure that only valid data is clocked into the respective first, second, third and fourth data processing elements 30, 31, 32 and 33, each of these data processing elements 30, 31, 32 and 33 and sub-elements 30a-30c, 31a-31c, and 32a-32c may remain disabled until data from the immediately preceding element is determined to be valid. Subsequent data processing elements 31 to 33 may be progressively enabled, for example, only when valid data is processed at the preceding element 30 to 32. In an embodiment of the invention the second, third and fourth data processing elements 31, 32 and 33 may be disabled by being maintained in a powered down state, and may be enabled by being powered up.

The control circuit 5 may include a power up controller block 42, and first, second, third, and fourth control blocks 37, 38, 39 and 40. The power up controller block 42 may send a signal to power up and/or power down one or more data processing elements, such as elements 31, 32, or 33, in a channel, such as channel 1. The first control block 37 may detect signal alignment of all three channels (if, for example, channel 1 is not disabled) and adjust delay in elements 31a-c accordingly, by waiting for a combined data enable signal. The combined data enable signal may be obtained from the control codes extracted from the serial data as it is being converted to parallel data in the sub-data processing elements 30a, 30b and 30c. The presence of a combined data enable signal in the data from the three sub-data processing elements 30a, 30b and 30c may indicate that valid data is being produced by these elements 30a, 30b, and 30c. If one or more of the channels are disabled or powered down, for example, channel 1, then the first control block 37 may detect alignment and adjust delay in the remaining channels, such as channels 0 and 2. A power up signal from the power up control block 42 may be used to begin powering up one or more of the process elements of the powered down channel. A power up signal from the power up control block 42 may also be used by other control blocks, such as first control block 37, to begin re-including the powered control block after detecting a combined data enable signal in the powered up channel. Thus, in the case of the first control block 37, the first control block 37 may begin detecting alignment and adjusting delay in all three channels again after the first control block 37 detects a power up signal from the power up control block 42 to power up channel 1, and the first control block 37 detects a combined data enable signal in all three channels.

After detecting the power up signal from the power up control block 42, the first control block 37 may wait until it detects a rising edge or other trigger of the data enable signal in the powered up channel before beginning to align the data in the powered channel with the remaining powered up channels.

Second control block 38 may also wait until it detects a power up signal from the power up control block 42 indicating that respective processing elements in a powered down channel are being powered back up. After detecting the power up signal from the power up control block 42, the second control block 38 may then wait until it detects a data enable signal, such a corresponding rising pulse edge, on the channel being powered up before it begins to detect or extract a preamble signal indicating that the data in the powered up channel is valid packet data or valid video data.

The blocks 39 and 40 may merge data enable signals on the channels. The power up signal from the previous block 38 may be delayed by the pipeline of the decoder elements 32a, 32b and/or 32c so that the data has sufficient time to be processed by the decoding elements 32.

FIG. 4 shows exemplary functionality of the control block 42 and first, second, third, and fourth control blocks when processing data. A power up control block 42 of the control circuit 5 may output activation signals to control blocks 37, 38, and 39 as well as to components and/or processing elements of a channel, such as channel 1 when channel 1 is to be switched from a powered down mode to a powered up mode. The power up control block 42 may also output deactivation signals as well when the channel is to be switched from a powered up mode to a powered down mode. Upon receiving the activation signals, one or more of the control blocks, such as first or second control blocks 37 or 38, may begin monitoring the channel to be powered up to detect a rising edge of data enable signal on the powered up channel.

Once the rising edge of the data enable signal is detected on the powered up channel, the control block may begin processing the channel data. For example, once the first control block 37 detects a rising edge of the data enable signal on the powered up channel after receiving the activation signal indicating that the channel was being powered up, the first control block 37 may begin aligning the data in the recently powered up channel with the other channels.

Similarly, once the second control block 38 detects a rising edge of the data enable signal on the powered up channel after receiving the activation signal indicating that the channel was being powered up, the second control block 38 may begin extracting a preamble signal from the powered up channel identifying data as video data or packet data. The third and/or fourth control blocks 39 and/or 40 may not include the data enable signal from the powered up channel in the merging of the data enable signals until the corresponding power up from block 38 is active and the pipeline delay of the TDMS/TERC4 decoder 32 has elapsed.

Similarly, when deactivation signals from the power up control block 42 are received at one or more of the other corresponding control blocks, those control blocks may begin to ignore data in the channel to be powered down.

When switching from one input port 2 to another input port 2 in order to change the audio and video data being supplied to the output port 3, the components of channel 1 of the newly selected input port 2 may be powered up sequentially. The digital data processing system 29 may be operated as previously discussed to process data received on channels 0, 1 and 2 of the newly selected port 2. Sending data to each data processing element only when valid data is detected at a preceding processing element may ensure that only valid data is produced at the fourth data processing element 33. Assuming that the decryption engine 20 of the newly selected input port 2 is already authenticated and synchronized with the encryption engine of the corresponding HDMI source as previously discussed, the only remaining delay in switching from one input port 2 to another input port 2 is the time required to activate the components of channel 1 of the newly selected input port 2. In general, this may not require more than 3 milliseconds. Moreover, the pipelining delay in pipelining the data through the first, second, third and fourth digital data processing elements 30 to 33 may take no more than a few clock cycles. Thus, the time required to switch input ports is greatly reduced.

Control circuit 5 may also be programmed to power down the components in the channel 1 of each input port 2 that is to be operated in the power saving mode. These components may be powered down in a predefined sequence to minimize and/or avoid power surges that may destabilize the channels 0, 1 and 2 of the selected input port 2 and may distort the audio/video signal being outputted through the output port 3. The components may also be powered up in a predefined sequence for the same reasons.

When powering up an input port 2 operating in the power saving mode, the automatic gain control, the equalizer and the sampling circuit of channel 1 may be powered up in sequence with the automatic gain control circuit 15b of channel 1 being initially powered up, followed by the equalizer 16b of channel 1, and then the sampling circuit 17b of channel 1 being powered up. A time delay of 1 millisecond may provided between the powering up of each these circuits 15b, 16b, and 17b.

When powering down an input port 2 to enter a power saving mode, the automatic gain control 15b, the equalizer circuit 16b and the sampling circuit 17b of channel 1 of that input port 2 may be powered down in the reverse sequence. Thus, sampling circuit 17b may be powered down first, followed by equalizer 16b, and then automatic gain control 15b of channel 1. A time delay of 1 millisecond may also be provided between powering down of each of these circuits 17b, 16b, and 15b.

Figure 5:
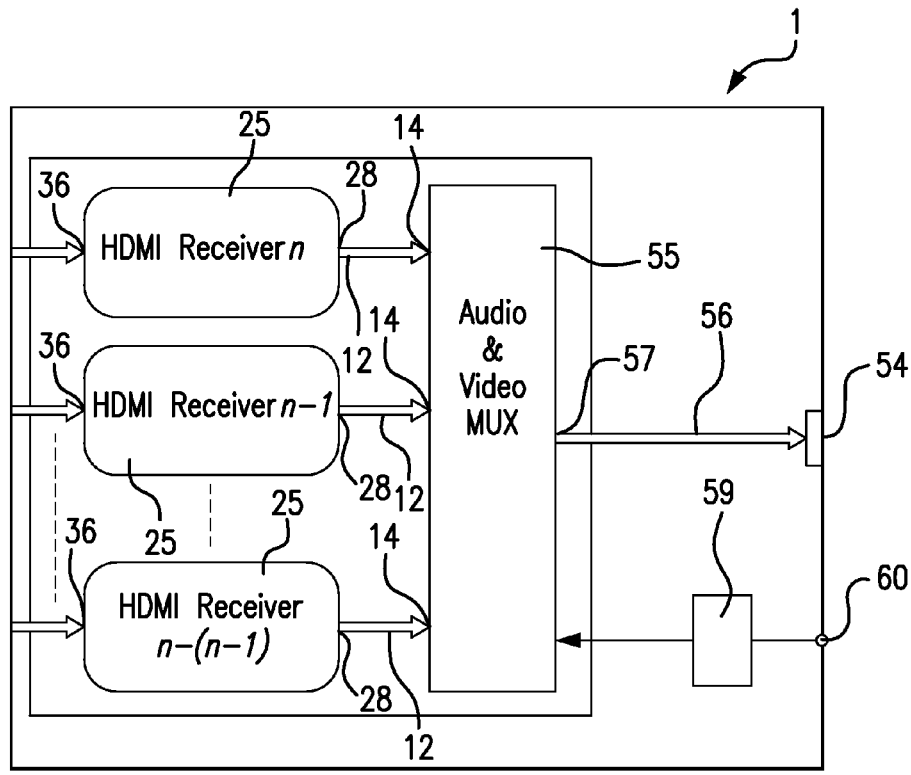
FIG. 5 shows a block representation of a different embodiment of the invention.

FIG. 5 shows a block representation of a different embodiment of the invention. In this embodiment, the HDMI circuit 1 may include multiple HDMI sinks 25, namely n HDMI sinks where n may be any integer greater than one. In some embodiments, the number of sinks n may be in the order of four to six. Each of the HDMI sinks 25 may be similar in design and function. Each of the HDMI sinks 25 may process HDMI digital audio and video data from respective HDMI sources connected to the input port 36 of each respective sink 25 to generate processed audio and video signals in a format recognized by a digital signal processing device connected to a primary output 54 of the circuit 1. In some instances, the digital signal processing device connected to the primary output port 54 may be a television or other display device, though other devices may be used in other embodiments.

Each of the output ports 28 of the HDMI sinks 25 may be connected to the primary output port 54 of the circuit 1 through digital data paths. Each of the digital paths may include a set of first data paths 12 that connect the output ports 28 of each sink 25 to a respective input port 14 of a multiplexer 55. The digital paths may also include a second data path 56 that connects an output port 57 of the multiplexer 55 to the primary output 54 of the circuit 1. The multiplexer may be configured to selectively apply processed auto and video signals from an output port 28 of a selected sink 25 to the primary output 54 of the circuit 1.

A selecting circuit 59 may send a sink select signal to instruct the multiplexer 55 to select a desired sink 25 output port 28 that is to be selectively applied to the primary output 54 of the circuit 1. An externally generated source select signal may be received at an input terminal 60 and transmitted to the selecting circuit 59 to select the desired sink 25 output port 28. The selecting circuit 59 may output a sink select signal to the multiplexer 55 in response to receiving a source select signal from the input terminal 60. The source select signal may be applied to the input terminal 60 from different sources, such as a handheld remote control device or a device to which the processed digital audio and video signals are applied through the primary output port 5.

Figure 6:
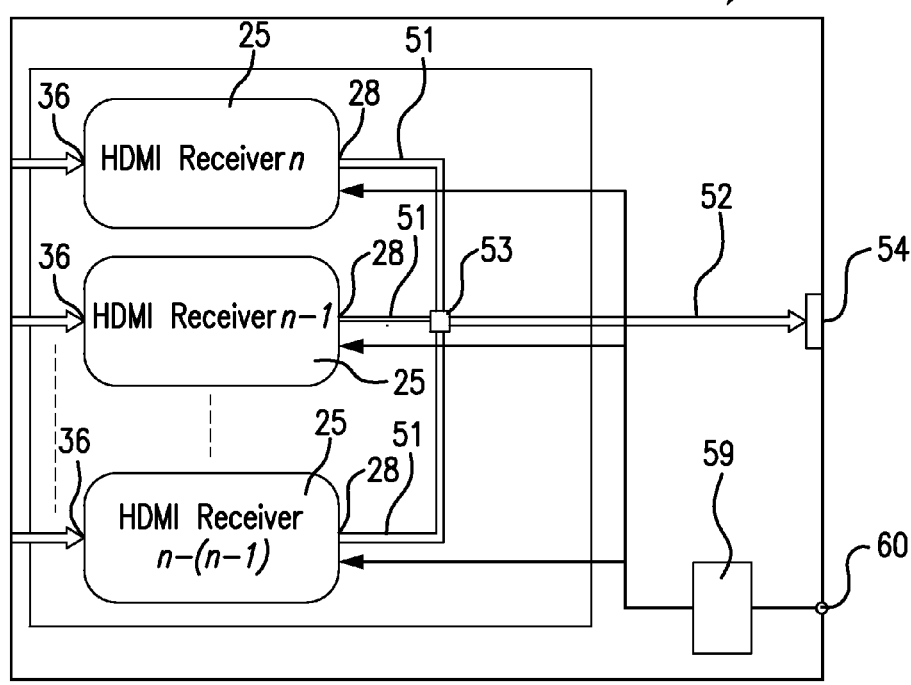
FIG. 6 shows another block representation of a different embodiment of the invention.

FIG. 6 shows a block representation of another embodiment of the invention. In this a HDMI circuit 50 may be similar in design to circuit 1. For example, circuit 50 may include multiple sinks 25, each sink 25 having an input port 36 and output port 28. Just as in circuit 1, circuit 50 may have two or more sinks 25 similar to the sinks 25 used in circuit 1.

A difference between circuit 50 in FIG. 6 and circuit 1 in FIG. 5 is that the sink 25 output ports 8 in circuit 50 may be directly connected to the primary output port 54 of the circuit 50 instead of being connected to the primary output port 54 through a multiplexer 55 as in circuit 1. In circuit 50, the first data paths 51 may connect the output ports 28 of each sink 25 to a connector 53 that connects the first data paths 51 to second data path 52 connected to the primary output port 54.

The selecting circuit 59 in circuit 50 may also be responsive to a source select signal received at input terminal 60. However, in this embodiment, the output ports 28 of each sink 25 may be selectively enabled and disabled according to enable and disable signals produced by the selecting circuit 59. During normal operation, each of the output ports 28 may be disabled, except for a selected output port 28 of a selected sink 25 with processed audio/video data applied to the primary output port 54 to be sent to a connected signal processing device, such as a television.

The selecting circuit 59 may send an enable signal to the selected output port 28 in response to receiving a source select signal to enable the selected output port 28 from the input terminal 20. The enable signal may enable data from the selected output port 28 to transmitted to the primary output port 54.

Even though non-selected output port 28 of non-selected sinks 25 may be disabled, each of these ports 28 may continuously process data in the serial digital data streams received at each input port 36 from a connected source. The digital signal processor 4 of each sink 25 may keep each decryption engine 20 of each sink 25 authenticated and synchronized with encryption engines of corresponding HDMI sources connected to respective input ports 36 of the sinks 25. The digital signal processor 4 of each sink 25 may also continue processing the data received at each input port 36 and may continue sending the processed data to the output port 28 of each sink 25.

For those non-selected sinks 25 operating in a power saving mode, data in powered down channels, such as the second channel, channel 1, may not be processed while the sink is in the power saving mode. While the digital signal processor 4 may continue processing data and sending the processed data to the output port 28 of each sink, data from the outputs of those sinks 25 that are disabled by the selecting circuit 59 may not be outputted to the primary output port 54. Instead, only output from an sink 25 enabled by the selecting circuit 59 may have its output applied to the primary output port 54.

Once a source select is received at input terminal 20 indicating that a new source is to be selected for output at the primary output port 54, the selecting circuit 59 may send a disable signal to the sink 25 with an input port 36 connected to the currently selected source. The selecting circuit 59 may also send an enable signal to the sink 25 with an input port 36 connected to the new source to apply the output from the output port 28 of that sink 25 to the primary output port 54. Since each of the sinks 25 continuously process data received on each channel of respective input port 6 and produce the processes data at the respective output ports 28 of each sink 25, once a disable output port 28 is subsequently enabled, the processed data at the respective output port 28 may be immediately applied to the primary output port 54. This may result in minimal delay since outputted data from the newly selected source may be immediately supplied to the primary output port 54 when switching sources.

While the digital data processing system may be located in and/or used in conjunction with a HDMI sink, the system may also be used in any other situation in which digital data is being processed, such as in, for example, devices using digital visual interfaces (DVI), to avoid the production of invalid data during data processing. Moreover, while the digital data processing system has been described as comprising four data processing elements, other embodiments may include any number of data processing elements. Indeed, it is generally envisaged that more than four data processing elements may be used in some embodiments.

Although each of the data processing elements have been described as carrying out specific functions, the data processing elements may be modified for other suitable or desired functions. Furthermore, the amount of delay, if any, associated with each data processing element may also vary.

The aforementioned system may be used in conjunction with a HDMI sink both in a power saving mode setting, when channel 1 of an input port is powered up after being powered down in the power saving mode, and a non-power saving mode, when each of the three channels 0, 1 and 2 of an input port is powered up after being operated in a fully powered down mode.

While the HDMI sink has been described as including four input ports, in different embodiments, the HDMI or other sink may include any number of input ports.

The foregoing description has been presented for purposes of illustration and description. It is not exhaustive and does not limit embodiments of the invention to the precise forms disclose

We claim:

1. A data processing system comprising:
   a data converter processing element to convert serial data at a plurality of input channels of an input port to parallel data at respective output channels, each channel including a component to process data in the channel when powered up;
   a control circuit to power down the component of a selected channel in a first mode and to power up the component in a second mode; and
   a delay processing element to detect valid data in each output channel and selectively delay output channel data to align the data in those powered up component channels carrying detected valid data.

2. The data processing system of claim 1, further comprising a decoder processing element to decode transition minimized differential signalling (TMDS) or TMDS error reduction coding (TERC4) encoded signals aligned by the delay processing element into natural binary.

3. The data processing system of claim 2, further comprising a high bandwidth digital content protection (HDCP) processing element to perform high bandwidth digital content protection after the decoder processing element decodes the processed data.

4. The data processing system of claim 1, further comprising an output port, a plurality of input ports, and a switchably enabled selector to couple a selected input port with the output port, wherein each input port includes the plurality of channels, the converter processing element, the control circuit, and the delay processing element.

5. The data processing system of claim 4, wherein the processing elements in a channel of non-selected input ports are powered down in a power saving mode.

6. The data processing system of claim 2, wherein the decoder processing element decodes TERC4 encoded signals.

7. The data processing system of claim 3, wherein the delay, decoder, and HDCP processing elements are retained disabled and the control circuit is configured to progressively enable each of these processing elements after detecting valid data at a preceding processing element.

8. The data processing system of claim 7, wherein the control circuit enables the delay processing element after detecting valid data at the converter processing element.

9. The data processing system of claim 8, wherein the control circuit enables the decoder processing element after detecting valid data at the delay processing element.

10. The data processing system of claim 9, wherein the control circuit enables the HDCP processing element after detecting valid data at the decoder processing element.

11. A method comprising:
    converting serial HDMI data at a plurality of channels of an input port to parallel data, each channel including a component to process data when powered up;
    selectively powering down the component of a selected channel to enter a power savings mode and powering up the component to exit the power saving mode;
    identifying those powered up component channels carrying valid data; and
    delaying the converted parallel data in at least one of the identified channels to align data among the identified channels.

12. The method of claim 11, further comprising performing error reduction coding on the data in the identified channels after alignment to decode transition minimized differential signalling (TMDS) or TMDS error reduction coding (TERC4) encoded signals.

13. The method of claim 12, further comprising protecting high bandwidth digital content (HDCP) after performing error reduction coding.

14. The method of claim 11, further comprising coupling the input port to an output port in a sink, wherein the input port is selected from a plurality of input ports in the sink.

15. The method of claim 14, further comprising powering down processing elements in a channel of non-selected input ports to enter the power saving mode.

16. The method of claim 13, further comprising progressively enabling delay, decoder, and HDCP processing elements after detecting valid data at a preceding processing element.

17. The method of claim 16, wherein the delay processing element is enabled after detecting valid data at a converter processing element.

18. The method of claim 17, wherein the decoder processing element is enabled after detecting valid data at the delay processing element.

19. The method of claim 18, wherein the HDCP processing element is enabled after detecting valid data at the decoder processing element.

* * * * *